US005616282A

United States Patent [19]

Harichian et al.

[11] Patent Number: 5,616,282

[45] Date of Patent: Apr. 1, 1997

[54] AMIDO PEROXYCARBOXYLIC ACID ENHANCED BLEACHING THROUGH COMBINATION WITH A FATTY AMIDE SUBSTITUTED SUGAR

[75] Inventors: Bijan Harichian, South Orange; Janet L. Coope, Hackensack, both of N.J.

[73] Assignee: Lever Brothers Company, Division of Conopco, Inc., New York, N.Y.

[21] Appl. No.: 439,044

[22] Filed: May 11, 1995

[51] Int. Cl.[6] .............................. C01B 15/00; D06L 3/02

[52] U.S. Cl. .............................. 252/186.42; 252/186.1; 252/186.6; 8/111; 510/310; 510/375

[58] Field of Search .............................. 252/186.1, 186.26, 252/186.42, 102; 8/111

[56] References Cited

U.S. PATENT DOCUMENTS

| | | | |
|---|---|---|---|
| 5,220,052 | 6/1993 | Troughton et al. . | |
| 5,268,003 | 12/1993 | Coope et al. . | |
| 5,326,904 | 7/1994 | Sankey . | |
| 5,332,528 | 7/1994 | Pan et al. | 252/174.23 |
| 5,397,501 | 3/1995 | Coope | 252/186.42 |
| 5,401,435 | 3/1995 | Burzio et al. . | |

FOREIGN PATENT DOCUMENTS

| | | |
|---|---|---|
| WO92/01655 | 4/1992 | WIPO . |
| WO95/18064 | 7/1995 | WIPO . |

*Primary Examiner*—Shean C. Wu
*Attorney, Agent, or Firm*—Milton L. Honig

[57] ABSTRACT

A bleach composition is provided that includes an amido peroxycarboxylic acid and a $C_8$–$C_{22}$ fatty amide substituted sugar. The amide substituted sugar enhances the bleaching performance of the peracid.

3 Claims, No Drawings

AMIDO PEROXYCARBOXYLIC ACID ENHANCED BLEACHING THROUGH COMBINATION WITH A FATTY AMIDE SUBSTITUTED SUGAR

BACKGROUND OF THE INVENTION

1. Field of the Invention

The present invention concerns combinations of amido peroxycarboxylic acids and fatty amide substituted sugars that provide enhanced bleaching performance.

2. The Related Art

Amido peroxycarboxylic acids have in the last several years been recognized as effective bleaching agents. They can be delivered from powdered formulations but are particularly useful in a liquids context. Most peracids relatively rapidly decompose over time when stored in water. Aqueous solutions of surfactants cause even greater solubilization of peracids and hence promote faster decomposition. By contrast, both the insolubility and structural chemistry of the amido peroxycarboxylic acids allow them to be suspended in aqueous liquids for relatively long storage periods without decomposition. Half-lives in surfactant solutions, even at the relatively elevated temperature of 40° C., are at least 15 days, and often at least 30 days.

U.S. Pat. No. 5,326,904 (Sankey) and co-pending application Ser. No. 07/860,828, filed Mar. 31, 1992 (Coope et al.) describe the synthesis and stabilization of the amido peroxycarboxylic acids in surfactant-structured liquids. A great variety of surfactants were said to be useful in formulating the liquids to achieve suspension and, impliedly, detergency activity. Other than suspension, the literature has not indicated any other property that could be enhanced through peracid-surfactant interaction.

An important consideration in formulating a cleaning or detergent composition is to ensure that the active components are compatible with one another. Indeed, formulations are sought wherein the active components not only function for their intended effect but may even enhance the effect of other actives. For instance, it would be desirable to identify surfactants that could enhance the bleaching activity of peracids.

Accordingly, it is an object of the present invention to provide a bleach composition containing a peracid whose activity could be enhanced through the presence of a surfactant.

Another object of the present invention is to provide a bleach composition containing a peracid that is storage stable in a surfactant-structured liquid.

Still another object of the present invention is to provide a bleach composition that includes environmentally friendly, biodegradable components.

These and other objects of the present invention will become more apparent from consideration of the following summary, detailed description and examples.

SUMMARY OF THE INVENTION

A bleach composition is provided including:

(i) from about 0.1 to about 40% by weight of an amido peroxycarboxylic acid having the structure:

$$MOO\overset{O}{\overset{\|}{C}}R^1(R^2N)_{n'}\overset{O}{\overset{\|}{C}}(NR^3)_{n''}-R^4-(R^3N)_{m''}\overset{O}{\overset{\|}{C}}(NR^2)_{m'}R^1\overset{O}{\overset{\|}{C}}OOM$$

wherein:

$R^1$ is selected from the group consisting of $C_1$–$C_{12}$ alkylene, $C_5$–$C_{12}$ cycloalkylene, $C_6$–$C_{12}$ arylene and radical combinations thereof;

$R^2$ is selected from the group consisting of hydrogen, $C_1$–$C_{16}$ alkyl and $C_6$–$C_{12}$ aryl radicals and a carbonyl radical that can form a ring together with $R^4$;

$R^3$ is selected from the group consisting of hydrogen, $C_1$–$C_{16}$ alkyl and $C_6$–$C_{12}$ ring together with $R^4$;

$R^4$ is selected from the group consisting of $C_1$–$C_{12}$ alkylene, $C_5$–$C_{12}$ cycloalkylene and $C_6$–$C_{12}$ arylene radicals;

n' and n" each are an integer chosen such that the sum thereof is 1;

m' and m" each are an integer chosen such that the sum thereof is 1;

M is selected from the group consisting of hydrogen, alkali metal, alkaline earth metal, ammonium and alkanolammonium cations and radicals; and (ii) from about 0.1 to about 50% of a $C_8$–$C_{22}$ fatty amide substituted sugar.

DETAILED DESCRIPTION OF THE INVENTION

Now it has been found that certain amido peroxycarboxylic acids can be enhanced in their bleach performance by formulation with $C_8$–$C_{12}$fatty amide substituted sugars.

Amido peroxycarboxylic acids of the present invention are those having the structure:

$$MOO\overset{O}{\overset{\|}{C}}R^1(R^2N)_{n'}\overset{O}{\overset{\|}{C}}(NR^3)_{n''}-R^4-(R^3N)_{m''}\overset{O}{\overset{\|}{C}}(NR^2)_{m'}R^1\overset{O}{\overset{\|}{C}}OOM$$

wherein:

$R^1$ is selected from the group consisting of $C_1$–$C_{12}$ alkylene, $C_5$–$C_{12}$ cycloalkylene, $C_6$–$C_{12}$ arylene and radical combinations thereof;

$R^2$ is selected from the group consisting of hydrogen, $C_1$–$C_{16}$ alkyl and $C_6$–$C_{12}$ aryl radicals and a carbonyl radical that can form a ring together with $R^4$;

$R^3$ is selected from the group consisting of hydrogen, $C_1$–$C_{16}$ alkyl and $C_6$–$C_{12}$ ring together with $R^3$;

$R^4$ is selected from the group consisting of $C_1$–$C_{12}$ alkylene, $C_5$–$C_{12}$ cycloalkylene and $C_6$–$C_{12}$ arylene radicals;

n' and n" each are an integer chosen such that the sum thereof is 1;

m' and m" each are an integer chosen such that the sum thereof is 1; and

M is selected from the group consisting of hydrogen, alkali metal, alkaline earth metal, ammonium and alkanolammonium cations and radicals.

Illustrative of specific amido peroxycarboxylic acids suitable for the present invention are the following:

N,N'-Di(4-percarboxybenzoyl) piperazine (PCBPIP)

N,N'-Di(4-percarboxybenzoyl) ethylenediamine (PCBED)

N'N'-Di(4-percarboxybenzoyl) phenylenediamine (1,4-PCBPD)

N,N'-Di(4-percarboxybenzoyl)-1,4-diaminocyclohexane (PCBHEX)

N,N'-Di(percarboxyadipoly) phenylenediamine (DPAPD)

N,N'-Di(4-percarboxybenzoyl)-butanediamine (PCBBD)

N,N'-Di(4-percarboxybenzoyl)-1,2-phenylenediamine (1,2-PCBPD)

N,N'-Succinoyl-di(4-percarboxy)aniline (SDPCA)

N,N'-Terephthaloyl-di(6-aminoperoxycaproic acid) (TPCAP)

Amounts of the amido peroxycarboxylic acid of the present invention may range from about 0. 1 to about 40%, preferably from about 1 to about 10% by weight.

A second essential component of compositions according to the present invention is that of $C_8$–$C_{22}$ fatty amide substituted sugar. Among suitable sugars are those selected from the group consisting of glucose, fructose, maltose, lactose, galactose, mannose, xylose, lactobiose, maltobiose, cellobiose, melibiose, gentibiose and combinations thereof.

Preferred fatty amide substituted sugars of the present invention are those having the structural formulas (I) and (II):

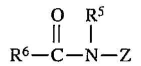

(I)

wherein:

$R^5$ is selected from the group consisting of hydrogen, $C_1$–$C_4$ alkyl, $C_1$–$C_4$ hydroxyalkyl and radical mixtures thereof;

$R^6$ is a $C_8$–$C_{22}$ alkyl or alkenyl radical; and

Z is a sugar radical.

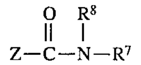

(II)

wherein:

$R^7$ and $R^8$ are independently selected from the group consisting of hydrogen, $C_1$–$C_{22}$ alkyl or alkenyl and radical combinations thereof, with the proviso that at least one of $R^7$ or $R^8$ is a $C_8$–$C_{22}$ alkyl or alkenyl radical; and Z is a sugar radical, particularly a disaccharide such as a lactobionic or maltobionic acid.

A particularly preferred fatty amide substituted sugar is the disaccharide lactobionamide of the structure set forth below:

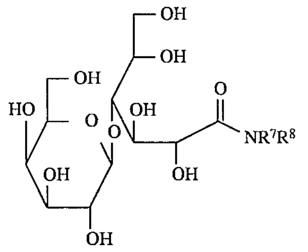

wherein at least one of $R^7$ and $R^8$ is a $C_8$–$C_{22}$ alkyl or alkenyl radical, the remaining radical optionally being hydrogen.

Most preferred are tallow or oleyl lactobionamides.

The amount of fatty acid amide substituted sugar according to the present invention may range from about 0.1 to about 50%, preferably from about 0.5 to about 20%, optimally from about 1 to about 10% by weight.

Although the present invention requires no further surfactants, and some may even interfere with the enhanced bleaching activity, there may be included other surface-active materials. These may either be anionic, nonionic, amphoteric, zwitterionic, cationic actives or mixtures thereof.

Many suitable actives are commercially available and are fully described in the literature, for example in "Surface Active Agents and Detergents", Volumes I and II, by Schwartz, Perry and Berch. Amounts of the additional surface-active material, beyond the fatty amide sugar, may range from about 0.1 to about 50%, preferably being from about 2 to 30% by weight.

The bleach compositions of the present invention may also contain a detergency builder. Builder materials may be selected from (1) calcium sequestrant materials, (2) precipitating materials, (3) calcium ion-exchange materials and (4) mixtures thereof.

In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethylmalonate, carboxymethyloxysuccinate, tartrate mono- and di-succinates, oxydisuccinate, crystalline or amorphous aluminosilicates and mixtures thereof.

Polycarboxylic homo- and copolymers may also be included as builders and as powder structurants or processing aids. Particularly preferred are polyacrylic acid (available under the trademark Acrysol from the Rohm and Haas Company) and acrylic-maleic acid copolymers (available under the trademark Sokalan from the BASF Corporation) and alkali metal or other salts thereof.

These builder materials may be present at a level of, for example, from 1 to 80% by weight, preferably from 3 to 30% by weight.

Upon dispersal in a wash water, the initial amount of peroxyacid should range in amount to yield anywhere from about 0.05 to about 250 ppm active oxygen per liter of water, preferably between about 1 to 50 ppm. Surfactant should be present in the wash water from about 0.05 to 3.0 grams per liter, preferably from 0.15 to 2.4 grams per liter. When present, the builder amount will range from about 0.1 to 3.0 grams per liter.

Formulations of the present invention may either be in liquid, powder, gel or tablet form. When liquid the formulation may either be aqueous or nonaqueous (e.g. carried in a polyol vehicle).

Apart from the components mentioned, the bleach compositions of the present invention can contain any of the conventional additives in the amounts in which such materials are normally employed in detergent compositions. Examples of these additives include lather boosters such as alkanolamides, particularly the monoethanolamides derived from palmkernel fatty acids and coconut fatty acids, lather depressants such as alkyl phosphates and silicones, antiredeposition agents such as sodium carboxymethylcellulose and alkyl or substituted alkylcellulose ethers, other stabilizers such as ethylene diamine tetraacetic acid, fabric softening agents, inorganic salts such as sodium sulphate and usually present in very small amounts, fluorescent whitening agents, perfumes, enzymes such as proteases, cellulases, lipases and amylases, germicides and colorants.

The following examples will more fully illustrate the embodiments of this invention. All parts, percentages and proportions referred to herein and in the appended claims are by weight unless otherwise illustrated.

EXAMPLE 1

General Experimental Conditions

One liter Terg-O-Tometer® experiments were conducted for a 15 minute wash period at 40°, 25° or 15° C. Four BC-1

(tea stained) cotton cloths were used in each liter terg pot. A pH of 8 was maintained with 0.01 m sodium bicarbonate. Peracid was dosed either as an aqueous slurry (0.87% active oxygen) or as a finely ground solid (80% active). No difference was discerned between the two product forms. Fatty acid amides, unless otherwise stated were dosed at 2.5 wt. % aqueous solution. Results are reported as ΔR which is defined as the change in reflectance of the cloth after washing minus the reflectance before washing. Effects due to the surfactant are not subtracted. Values in the Tables are the average of at least 2 experiments.

Surfactant and Temperature Effects

The present Example illustrates the effect of various surfactants and different temperatures on bleaching performance of TPCAP (a representative amido peroxycarboxylic acid). Conditions of wash were: pH 8, 5 ppm active oxygen peracid, 0.25 g/l surfactant and 0.84 g/l sodium bicarbonate.

TABLE I

TEA STAIN BLEACHING USING TPCAP WITH LACTOBIONAMIDES

| SURFACTANT | ΔR 40° C. | ΔR 25° C. | ΔR 15° C. |
|---|---|---|---|
| None | 5.7 | 2.7 | 1.3 |
| Linear Alkyl Sulfonate (LAS) | 5.4 | 2.1 | — |
| Neodol 25-7 ® (Nonionic) | 5.7 | 2.1 | — |
| Tallow lactobionamide | 6.9 | 5.9 | 2.7 |
| Oleyl Lactobionamide | — | 6.0 | — |
| Tallow lactobionamide/Neodol ® (4:1) | 6.2 | 4.2 | — |
| Tallow Lactobionamide/LAS (4:1) | 5.7 | — | — |
| Oleyl lactobionamide/LAS (4:1) | — | 2.1 | — |

At 25° C., TPCAP gives 2.7 units of bleaching without surfactant. With the typical commercial anionic or nonionic surfactants, i.e. LAS or Neodol 25-7®, the bleach value lowers to 2.1 units. Use of the same weight of tallow or oleyl lactobionamide results in a ΔR of about 6 units, a 2–3 fold increase in bleaching. Performance is also doubled at 15° C. on going from sodium bicarbonate alone to tallow lactobionamide. The effect is smaller at 40° C., although still a 20% increase in bleaching is evident between tallow lactobionamide and Neodol 25-7®.

EXAMPLE 2

This Example illustrates the effect of amido peroxycarboxylic acid with fatty amide substituted sugars representative of the structure (I). Wash conditions were as follows: pH 8, 5 ppm active oxygen peracid, 0.25 g/l surfactant and 0.84 g/l sodium bicarbonate at 25° C.

TABLE II

TEA STAIN BLEACHING USING TPCAP WITH GLUCAMIDES

| SURFACTANT | ΔR |
|---|---|
| None | 2.0 |
| $C_{12}$ N-Methyl Glucamide | 2.1 |
| $C_{14}$ N-Methyl Glucamide | 2.3 |
| $C_{16}$ N-Methyl Glucamide | 2.4 |

Based on the results in Table II, it is observed that the glucamides were less: effective than the lactobionamides but did provide a benefit in bleaching.

EXAMPLE 3

This Example illustrates the performance of PCBED, another representative amido peroxycarboxylic acid, in combination with various other surfactants. Wash conditions were as follows: pH 8, 5 ppm active oxygen peracid, 0.25 g/l surfactant and 0.84 g/l sodium bicarbonate.

TABLE III

TEA STAIN BLEACHING USING PCBED WITH VARIOUS SURFACTANTS

| SURFACTANT | ΔR 25° C. | ΔR 15° C. |
|---|---|---|
| None | — | 1.4 |
| Neodol 25-7 ® | 3.6 | — |
| Tallow Lactobionamide | 4.6 | 2.6 |
| Oleyl Lactobionamide | 5.1 | — |

From Table III it is evident that both lactobionamides interacted favorably with the PCBED peracid. The bleach enhancement was substantially better than with a typical nonionic surfactant, i.e. Neodol 25-7®.

The foregoing description and Examples illustrate selected embodiments of the present invention and in light thereof various modifications will be suggested to one skilled in the art, all of which are within the spirit and purview of this invention.

What is claimed is:

1. A bleach composition comprising:

(i) from about 0.1 to about 40% by weight of an amido peroxycarboxylic acid having the structure:

$$MOO\overset{O}{\overset{\|}{C}}R^1(R^2N)_{n'}\overset{O}{\overset{\|}{C}}(NR^3)_{n''}—R^4—(R^3N)_{m''}\overset{O}{\overset{\|}{C}}(NR^2)_{m'}R^1\overset{O}{\overset{\|}{C}}OOM$$

wherein:

$R^1$ is selected from the group consisting of $C_1$–$C_{12}$ alkylene, $C_5$–$C_{12}$ cycloalkylene, $C_6$–$C_{12}$ arylene and radical combinations thereof;

$R^2$ is selected from the group consisting of hydrogen, $C_1$–$C_{16}$ alkyl and $C_6$–$C_{12}$ aryl radicals and a carbonyl radical that can form a ring together with $R^4$;

$R^3$ is selected from the group consisting of hydrogen, $C_1$–$C_{12}$ alkyl and $C_6$–$C_{12}$ ring together with $R^4$;

$R^4$ is selected from the group consisting of $C_1$–$C_{12}$ alkylene, $C_5$–$C_{12}$ cycloalkylene and $C_6$–$C_{12}$ arylene radicals;

n' and n" each are an integer chosen such that the sum thereof is 1;

m' and m" each are an integer chosen such that the sum thereof is 1;

M is selected from the group consisting of hydrogen, alkali metal, alkaline earth metal, ammonium and alkanolammonium cations and radicals; and (ii) from about 0.1 to about 50% of a $C_8$–$C_{22}$ lactobionamide.

2. A composition according to claim 1 wherein the fatty lactobionamide is selected from the group consisting of tallow lactobionamide and oleyl lactobionamide.

3. A composition according to claim 1 wherein the amido peroxycarboxylic acid is N, N'-terephthaloyl-di(6-aminoperoxycaproic acid) or N, N'-di(4-percarboxybenzoyl) ethylenediamine.

* * * * *